US011261120B2

(12) United States Patent
Balduin et al.

(10) Patent No.: US 11,261,120 B2
(45) Date of Patent: Mar. 1, 2022

(54) GLASS-BENDING DEVICE AND GLASS-BENDING METHOD USING A FAN

(71) Applicant: SAINT-GOBAIN GLASS FRANCE, Courbevoie (FR)

(72) Inventors: Michael Balduin, Alsdorf (DE); Herbert Radermacher, Raeren (BE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 143 days.

(21) Appl. No.: 15/741,264

(22) PCT Filed: Aug. 15, 2016

(86) PCT No.: PCT/EP2016/069317
§ 371 (c)(1),
(2) Date: Dec. 31, 2017

(87) PCT Pub. No.: WO2017/029252
PCT Pub. Date: Feb. 23, 2017

(65) Prior Publication Data
US 2018/0194664 A1 Jul. 12, 2018

(30) Foreign Application Priority Data

Aug. 18, 2015 (EP) .................... 15181395

(51) Int. Cl.
*C03B 23/035* (2006.01)
*C03B 23/025* (2006.01)
(Continued)

(52) U.S. Cl.
CPC ...... *C03B 23/0357* (2013.01); *C03B 23/0252* (2013.01); *C03B 23/03* (2013.01); *C03B 23/0302* (2013.01); *C03B 35/147* (2013.01)

(58) Field of Classification Search
CPC .............. C03B 23/035; C03B 23/0352; C03B 23/0357
See application file for complete search history.

(56) References Cited

U.S. PATENT DOCUMENTS 3,114,571 A 12/1963 Carson et al.
3,473,909 A 10/1969 Bennett et al.
(Continued)

FOREIGN PATENT DOCUMENTS

CA 2861707 A1 9/2013
CN 1130600 A 9/1996
(Continued)

OTHER PUBLICATIONS

International Preliminary Report on Patentability for international Application No. PCT/EP2016/070140 filed Aug. 26, 2016 on behalf of Saint-Gobain Glass France, dated Mar. 13, 2018. 11 pages.
(Continued)

*Primary Examiner* — Jason L Lazorcik
(74) *Attorney, Agent, or Firm* — Pilisbury Winthrop Shaw Pittman LLP

(57) ABSTRACT

A glass bending device is presented. The glass bending device includes a bending chamber, a tool for holding at least one glass pane by means of a suction effect, including a downward-directed frame-like, convex contact surface and a cover with a peripheral air-guiding plate surrounding the contact surface at least in regions. The tool is suitable for sweeping the edge of the glass pane at least in sections with an air flow and thereby pressing the glass pane against the contact surface. The glass bending device further includes a fan, which is connected to the bending chamber via a feed line and a return line and is suitable for extracting air from the bending chamber via the tool and the feed line to produce the air flow and for returning air back into the bending
(Continued)

Figure 1:
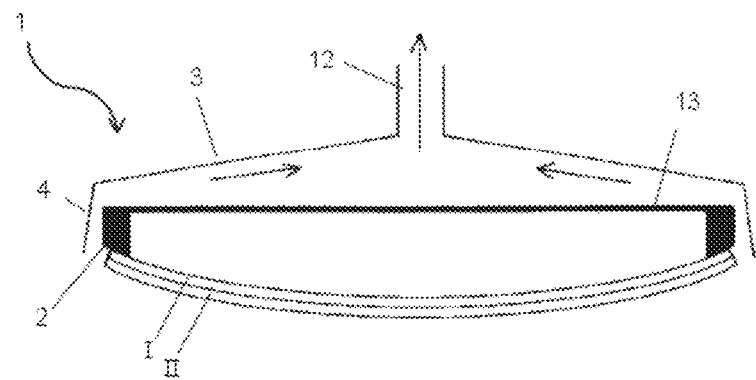

chamber via the return line. The return line is connected to the bending chamber above the tool.

8 Claims, 3 Drawing Sheets

(51) Int. Cl.
  *C03B 23/03* (2006.01)
  *C03B 35/14* (2006.01)

(56) References Cited

U.S. PATENT DOCUMENTS

| | | | |
|---|---|---|---|
| 3,778,244 A | | 12/1973 | Nedelec et al. |
| 4,115,090 A | | 9/1978 | Comperatore et al. |
| 4,229,199 A | | 10/1980 | Seymour et al. |
| 4,233,050 A | | 11/1980 | Comperatore et al. |
| 4,504,109 A | | 3/1985 | Taga et al. |
| 4,507,547 A | | 3/1985 | Taga et al. |
| 4,511,386 A | * | 4/1985 | Kellar ............... C03B 35/145 294/188 |
| 4,666,492 A | | 5/1987 | Thimons et al. |
| 4,678,495 A | | 7/1987 | Yoshizawa et al. |
| 4,682,997 A | * | 7/1987 | Halberschmidt ..... C03B 23/035 65/104 |
| 4,709,988 A | | 12/1987 | Kai et al. |
| 4,738,704 A | | 4/1988 | Vanaschen et al. |
| 4,764,196 A | * | 8/1988 | Boutier ............ C03B 23/0352 65/106 |
| 4,802,904 A | * | 2/1989 | Boutier ............ C03B 23/0352 65/106 |
| 4,842,634 A | * | 6/1989 | Vanaschen ........ C03B 23/0256 65/106 |
| 4,859,225 A | * | 8/1989 | Kuster ............ C03B 23/0357 65/104 |
| 4,877,437 A | | 10/1989 | Nitschke |
| 4,910,088 A | | 3/1990 | Baudin et al. |
| 4,952,227 A | | 8/1990 | Herrington et al. |
| 5,057,265 A | | 10/1991 | Cornils et al. |
| 5,203,905 A | | 4/1993 | Kuster et al. |
| 5,285,660 A | | 2/1994 | Petitcollin et al. |
| 5,292,355 A | * | 3/1994 | Nikander .......... C03B 23/0256 65/104 |
| 5,328,496 A | | 7/1994 | Lesage et al. |
| 5,372,624 A | * | 12/1994 | Lesage ............ C03B 23/0305 65/106 |
| 5,376,158 A | * | 12/1994 | Shetterly .............. C03B 23/03 65/106 |
| 5,383,947 A | * | 1/1995 | Montonen .......... C03B 23/035 65/106 |
| 5,421,940 A | | 6/1995 | Cornils et al. |
| 5,492,951 A | | 2/1996 | Beyrle et al. |
| 5,622,539 A | * | 4/1997 | Lesage .............. C03B 35/24 65/106 |
| 5,660,609 A | | 8/1997 | Muller et al. |
| 5,669,952 A | | 9/1997 | Claassen et al. |
| 5,693,112 A | * | 12/1997 | Lesage ............ C03B 23/0305 65/106 |
| 5,713,976 A | * | 2/1998 | Kuster ............ C03B 23/0252 65/106 |
| 5,769,919 A | | 6/1998 | Claassen et al. |
| 5,833,729 A | | 11/1998 | Meunier et al. |
| 5,938,810 A | | 8/1999 | De Vries et al. |
| 6,076,373 A | | 6/2000 | Grodziski |
| 6,138,477 A | | 10/2000 | Morin |
| 6,309,755 B1 | | 10/2001 | Matsco et al. |
| 6,318,125 B1 | * | 11/2001 | Diederen ........... C03B 23/0352 65/102 |
| 6,365,284 B1 | | 4/2002 | Liposcak et al. |
| 6,432,545 B1 | | 8/2002 | Schicht et al. |
| 6,572,990 B2 | | 6/2003 | Oyama et al. |
| 6,668,589 B1 | * | 12/2003 | Mizusugi ........... C03B 23/0357 65/106 |
| 6,749,926 B1 | | 6/2004 | Yoshizawa |
| 7,231,787 B2 | | 6/2007 | Neuman et al. |
| 7,302,813 B2 | | 12/2007 | Balduin et al. |
| 7,648,768 B2 | | 1/2010 | Thiel et al. |
| 7,655,313 B2 | | 2/2010 | Blacker et al. |
| 8,146,387 B2 | | 4/2012 | Ollfisch et al. |
| 8,327,667 B2 | | 12/2012 | Balduin et al. |
| 8,746,011 B2 | | 6/2014 | Balduin et al. |
| 8,978,418 B2 | | 3/2015 | Balduin et al. |
| 9,452,662 B2 | | 9/2016 | Balduin et al. |
| 9,650,279 B2 | | 5/2017 | Balduin et al. |
| 9,650,291 B2 | | 5/2017 | Manz et al. |
| 2002/0117250 A1 | | 8/2002 | Veerasamy |
| 2002/0189295 A1 | | 12/2002 | Bennett et al. |
| 2002/0192473 A1 | | 12/2002 | Gentilhomme et al. |
| 2003/0182969 A1 | | 10/2003 | Dunifon |
| 2004/0107729 A1 | | 6/2004 | Fukami et al. |
| 2004/0129028 A1 | | 7/2004 | Balduin et al. |
| 2004/0219368 A1 | | 11/2004 | Coster et al. |
| 2005/0002081 A1 | | 1/2005 | Beteille et al. |
| 2005/0123772 A1 | | 6/2005 | Coustet et al. |
| 2005/0142332 A1 | | 6/2005 | Sauer |
| 2006/0182980 A1 | | 8/2006 | Barton et al. |
| 2007/0026238 A1 | | 2/2007 | Chiappetta et al. |
| 2007/0039354 A1 | | 2/2007 | Ollfisch et al. |
| 2007/0157671 A1 | | 7/2007 | Thellier et al. |
| 2008/0070045 A1 | | 3/2008 | Barton et al. |
| 2008/0117371 A1 | | 5/2008 | Shin et al. |
| 2008/0134721 A1 | | 6/2008 | Maeda |
| 2008/0134722 A1 | | 6/2008 | Balduin et al. |
| 2008/0190143 A1 | | 8/2008 | Balduin et al. |
| 2009/0000334 A1 | | 1/2009 | Boisselle et al. |
| 2009/0047509 A1 | | 2/2009 | Gagliardi et al. |
| 2009/0117371 A1 | | 5/2009 | Glaeser et al. |
| 2009/0186213 A1 | | 7/2009 | Ihlo et al. |
| 2009/0277440 A1 | | 11/2009 | Angel et al. |
| 2009/0320824 A1 | | 12/2009 | Henn et al. |
| 2010/0236290 A1 | | 9/2010 | Fukami et al. |
| 2010/0257900 A1 | | 10/2010 | Yajima et al. |
| 2010/0314900 A1 | | 12/2010 | Labrot et al. |
| 2011/0027554 A1 | | 2/2011 | Gouardes et al. |
| 2011/0146172 A1 | | 6/2011 | Mauvernay et al. |
| 2011/0265515 A1 | | 11/2011 | Hernandez et al. |
| 2012/0045652 A1 | | 2/2012 | Zahn et al. |
| 2012/0055197 A1 | * | 3/2012 | Balduin ................ C03B 23/03 65/106 |
| 2012/0070624 A1 | | 3/2012 | Payen et al. |
| 2013/0042650 A1 | * | 2/2013 | Thellier ............ C03B 23/0352 65/106 |
| 2013/0129945 A1 | | 5/2013 | Durandeau et al. |
| 2013/0307286 A1 | | 11/2013 | Balduin et al. |
| 2013/0313852 A1 | | 11/2013 | Balduin et al. |
| 2013/0323415 A1 | | 12/2013 | Brackley et al. |
| 2013/0340479 A1 | | 12/2013 | Balduin et al. |
| 2014/0010976 A1 | | 1/2014 | Gerardin et al. |
| 2014/0011000 A1 | * | 1/2014 | Dunkmann .......... C03B 23/0357 428/174 |
| 2014/0230493 A1 | | 8/2014 | Balduin et al. |
| 2015/0146286 A1 | | 5/2015 | Hagen et al. |
| 2016/0002100 A1 | | 1/2016 | Melcher et al. |
| 2016/0340479 A1 | | 11/2016 | Crossley |
| 2017/0210663 A1 | * | 7/2017 | Balduin ............ C03B 23/0357 |
| 2017/0217820 A1 | * | 8/2017 | Balduin ............ C03B 23/0302 |
| 2018/0111355 A1 | | 4/2018 | Manz et al. |
| 2018/0170790 A1 | * | 6/2018 | Le Ny ............. C03B 23/0256 |
| 2018/0179099 A1 | * | 6/2018 | Le Ny ............. C03B 23/0355 |
| 2018/0186676 A1 | * | 7/2018 | Schall ............. C03B 23/0357 |

FOREIGN PATENT DOCUMENTS

| | | |
|---|---|---|
| CN | 1518524 A | 8/2004 |
| CN | 1531510 A | 9/2004 |
| CN | 2641043 Y | 9/2004 |
| CN | 1651345 A | 8/2005 |
| CN | 1764607 A | 4/2006 |
| CN | 101875536 A | 11/2010 |
| CN | 101888927 A | 11/2010 |
| CN | 103249685 A | 8/2013 |
| DE | 3615225 A1 | 11/1987 |
| DE | 3930414 A1 | 3/1991 |

(56) References Cited

FOREIGN PATENT DOCUMENTS

| | | |
|---|---|---|
| DE | 4232554 C1 | 1/1994 |
| DE | 4337559 C1 | 3/1995 |
| DE | 4334213 A1 | 4/1995 |
| DE | 19604397 C1 | 7/1997 |
| DE | 69219496 T2 | 12/1997 |
| DE | 69423700 T2 | 10/2000 |
| DE | 10105200 A1 | 8/2002 |
| DE | 10314266 B3 | 6/2004 |
| DE | 102005001513 B3 | 6/2006 |
| DE | 102007059323 A1 | 6/2009 |
| EA | 027316 B1 | 7/2017 |
| EP | 0262046 A2 | 3/1988 |
| EP | 0434656 A2 | 6/1991 |
| EP | 0515847 A2 | 12/1992 |
| EP | 0531152 A2 | 3/1993 |
| EP | 0536607 A2 | 4/1993 |
| EP | 0 571 824 A1 | 12/1993 |
| EP | 0576179 A1 | 12/1993 |
| EP | 0613865 A1 | 9/1994 |
| EP | 0677491 A2 | 10/1995 |
| EP | 0706978 A2 | 4/1996 |
| EP | 1047644 B1 | 1/2003 |
| EP | 1281613 A2 | 2/2003 |
| EP | 1358131 A2 | 11/2003 |
| EP | 1371616 A1 | 12/2003 |
| EP | 0877006 B1 | 1/2006 |
| EP | 1611064 B1 | 4/2008 |
| EP | 1218307 B1 | 7/2008 |
| EP | 1917222 B1 | 3/2009 |
| EP | 2141135 A1 | 1/2010 |
| EP | 2233444 A1 | 9/2010 |
| EP | 2247549 A2 | 11/2010 |
| EP | 1836136 B1 | 5/2011 |
| EP | 2463247 A1 | 6/2012 |
| EP | 2463248 A1 | 6/2012 |
| EP | 2639032 A1 | 9/2013 |
| EP | 2639032 B1 | 9/2014 |
| FR | 2097019 A1 | 3/1972 |
| GB | 813069 A | 5/1959 |
| JP | S4621038 Y1 | 7/1971 |
| JP | S49110710 A | 10/1974 |
| JP | S5130085 B1 | 8/1976 |
| JP | S5243855 B1 | 2/1977 |
| JP | S63027443 U | 2/1988 |
| JP | S63156027 A | 6/1988 |
| JP | H03504003 A | 9/1991 |
| JP | H05147959 A | 6/1993 |
| JP | H05195201 A | 8/1993 |
| JP | H0640732 A | 2/1994 |
| JP | H06256030 A | 9/1994 |
| JP | H08183626 A | 7/1996 |
| JP | 2002527349 A | 8/2002 |
| JP | 2006256902 A | 9/2006 |
| JP | 2006521271 A | 9/2006 |
| JP | 2006528932 A | 12/2006 |
| JP | 2008526659 A | 7/2008 |
| JP | 2010013345 A | 1/2010 |
| JP | 2013529170 A | 7/2013 |
| JP | 2014500222 A | 1/2014 |
| JP | 2014504229 A | 2/2014 |
| KR | 20040037078 A | 5/2004 |
| KR | 20070088745 A | 8/2007 |
| KR | 101343631 B1 | 12/2013 |
| KR | 20140019312 A | 2/2014 |
| RU | 2009107 C1 | 3/1994 |
| RU | 2036861 C1 | 6/1995 |
| RU | 2098362 C1 | 12/1997 |
| RU | 2444478 C1 | 3/2012 |
| RU | 2550611 C1 | 5/2015 |
| WO | 00/29347 A1 | 5/2000 |
| WO | 02/064519 A1 | 8/2002 |
| WO | 03/024649 A1 | 3/2003 |
| WO | 2004/087590 A2 | 10/2004 |
| WO | 2006/043026 A1 | 4/2006 |
| WO | 2006/072721 A1 | 7/2006 |
| WO | 2007/042688 A1 | 4/2007 |
| WO | 2010/074548 A1 | 7/2010 |
| WO | 2010/136702 A1 | 12/2010 |
| WO | 2011/088330 A2 | 7/2011 |
| WO | 2011/105991 A1 | 9/2011 |
| WO | 2012/022876 A2 | 2/2012 |
| WO | 2008080072 A1 | 6/2012 |
| WO | 2012080071 A1 | 6/2012 |
| WO | 2012/118612 A1 | 9/2012 |
| WO | 2012/131243 A1 | 10/2012 |
| WO | 2013/131667 A1 | 9/2013 |
| WO | 2014/166793 A1 | 10/2014 |
| WO | 2016/066309 A1 | 5/2016 |
| WO | 2016/066310 A1 | 5/2016 |
| WO | 2017/029252 A1 | 2/2017 |
| WO | 2017/042037 A1 | 3/2017 |
| WO | 2017/089070 A1 | 6/2017 |
| WO | 2017/129307 A1 | 8/2017 |

OTHER PUBLICATIONS

International Preliminary Report on Patentability for International Application No. PCT/EP2016/080918 filed Dec. 14, 2016 on behalf of Saint-Gobain Glass France, dated Jul. 31, 2017. 6 pages (English Translation + German Original).

International Search Report for International Application No. PCT/EP2015/070430 filed on Sep. 8, 2015 in the name of Saint-Gobain Glass France, dated Nov. 24, 2015. 8 pages. (English translation + German original).

International Search Report for International Application No. PCT/EP2015/070432 filed on Sep. 8, 2015 on behalf of Saint-Gobain Glass France, dated Dec. 7, 2015. 7 pages. (English translation + German original).

International Search Report for international Application No. PCT/EP2016/070140 filed Aug. 26, 2016 on behalf of Saint-Gobain Glass France, dated Oct. 19, 2016. 9 pages. (German Original + English translation).

International Search Report for International Application No. PCT/EP2016/076072 filed Oct. 28, 2016 on behalf of Saint-Gobain Glass France, dated Jan. 13, 2017. 5 pages. (German + English Translation).

International Search Report for international application No. PCT/EP2016/080918 filed on Dec. 14, 2016 in the name of Saint-Gobain Glass France, dated Feb. 13, 2017. 7 pages (German Original + English translation).

Non-Final Office Action for U.S. Appl. No. 15/328,471, filed Jan. 23. 2017, on behalf of Saint-Gobain Glass France, dated Dec. 11, 2018. 14 pages.

Non-Final Office Action for U.S. Appl. No. 15/328,475, filed Jan. 23, 2017 on behalf of Saint-Gobain Glass France, dated Mar. 18, 2019. 16 pages.

Non-Final Office Action for U.S. Appl. No. 15/578,699, filed Nov. 30, 2017 on behalf of Saint-Gobain Glass France dated Jun. 7, 2019 32 pages .

Restriction Requirement for U.S. Appl. No. 15/328,471, filed Jan. 23, 2017, on behalf of Saint-Gobain Glass France, dated Aug. 30, 2018. 7 pgs.

Restriction Requirement for U.S. Appl. No. 15/578,699, filed Nov. 30, 2017 on behalf of Saint-Gobain Glass France, dated Apr. 9, 2019. 7 pages.

International Preliminary Report on Patentability for international Application No. PCT/EP2015/070432 filed on Sep. 8, 2015 in the name of Saint-Gobain Glass France, dated May 2, 2017. 8 pages.

International Preliminary Report on Patentability for international Application No. PCT/EP2016/069317 filed Aug. 15, 2016 on behalf of Saint-Gobain Glass France, dated Feb. 20, 2018. 5 pages.

International Preliminary Report on Patentability for international Application No. PCT/EP2016/076072 filed Oct. 28, 2016 on behalf of Saint-Gobain Glass France, dated May 29, 2018. 7 pages. (German Original + English Translation).

International Preliminary Report on Patentability for International Application No. PCT/EP2015/070430 filed Sep. 8, 2015 on behalf of Saint-Gobain Glass France, dated May 2, 2017. 7 pages.

(56) References Cited

OTHER PUBLICATIONS

Written Opinion for International Application No. PCT/EP2016/070140 filed Aug. 26, 2016 on behalf of Saint-Gobain Glass France, dated Oct. 19, 2016. 9 pages. (German Original + English translation).
Written Opinion for International Application No. PCT/EP2015/070430 filed Sep. 8, 2015 on behalf of Saint-Gobain Glass France, dated Nov. 24, 2015. 12 pages. (English Translation + German Original).
Written Opinion for International Application No. PCT/EP2015/070432 filed Sep. 8, 2015 on behalf of Saint-Gobain Glass France, dated Dec. 7, 2015. 14 pages. (English Translation + German Original),.
Written Opinion for international Application No. PCT/EP2016/076072 filed Oct. 28, 2016 on behalf of Saint-Gobain Glass France, dated Jan. 13, 2017. 12 pages. (German + English Translation).
Written Orinion for International Application No. PCT/EP2016/080918 filed Dec. 14, 2016 on behalf of Saint-Gobain Glass France, dated Feb. 13, 2017. 9 pages (English Translation + German Original).
Written Opinion for International Application No. PCT/EP2016/069317 filed Aug. 15, 2016 on behalf of Saint-Gobain Glass France, dated Oct. 19, 2016. 9 pages. (German + English Translation).
Final Office Action for U.S. Appl. No. 15/328,471, filed Jan. 23, 2017 on behalf of Saint Gobain Glass France dated May 15, 2019 9 pages.
Final Office Action for U.S. Appl. No. 15/328,475, filed Jan. 23, 2017 on behalf of Saint Gobain Glass France dated Aug. 27, 2019 17 pages.
Final Office Action for U.S. Appl. No. 15/578,699, filed Nov. 30, 2017 on behalf of Saint-Gobain Glass France dated Sep. 3, 2019 20 pages.
Indian First Examination Report for IN Application No. 201837004251 filed on Feb. 5, 2018 on behalf of Saint Gobain Glass France dated Jun. 28, 2019 5 pages.
Restriction Requirement for U.S. Appl. No. 15/741,256, filed Dec. 30, 2017 on behalf of Saint-Gobain Glass France dated Sep. 17, 2019 8 pages.
Russian Office Action for RU Application No. 2018115725/03 filed on Dec. 14, 2016 on behalf of Saint Gobain Glass France dated Apr. 24, 2019 5 pages (English Translation Only).
International Search Report for International Application No. PCT/EP2016/069317 filed Aug. 15, 2016 on behalf of Saint-Gobain Glass France, dated Oct. 19, 2016. 5 pages. (German + English Translation).

\* cited by examiner

GLASS-BENDING DEVICE AND GLASS-BENDING METHOD USING A FAN

CROSS REFERENCE TO RELATED APPLICATIONS

The present application is the U.S. national stage of International Patent Application PCT/EP2016/069317 filed internationally on Aug. 15, 2016, which, in turn, claims priority to European Patent Application No. 15181395.3 filed on Aug. 18, 2015.

The invention relates to a glass bending device, a method which can be carried out therewith, and the use of a fan in such a device.

In the motor vehicle sector, bent composite glazings are common, in particular as windshields. It is known that it is advantageous to bend the individual panes of the composite glazing together simultaneously. Glass panes bent in pairs are matched to one another in terms of their curvature and are, consequently, especially suitable for laminating with one another to form the composite glazing. A method for paired bending of glass panes is known, for example, from DE 101 05 200 A1.

EP 1 836 136 B1 discloses another bending method as well as a generic tool, referred to there as "upper mould" (forme supérieure). The convex tool is used as the upper mould in a bending process and is suitable for holding the glass panes to be bent against the effect of gravity. The holding tool comprises a frame-like, convex contact surface and a cover having a peripheral air-guiding plate. By means of a suction effect along the pane edges, the glass pane to be bent is pressed against the action of gravity onto the contact surface and, thus, reliably held on the tool. Even two glass panes lying one atop the other can be simultaneously held in the tool. The tool can be used to transport the glass panes between various positions of the bending device, for example, to pick up the glass panes from one bending mould and to transfer them to another. The tool can also be used for a press-bending step, in which the glass panes are shaped between the tool and a complementary counter mould under the effect of pressure and/or suction. The air-guiding plate is also referred to in the technical jargon as a skirt; the holding of the glass pane using the air-guiding plate, as a skirt technique.

The suction effect necessary for holding the glass panes against the upper mould is typically produced using so-called venturi nozzles, which are operated with compressed air. To prevent cooling of the bending furnace, the compressed air must be preheated. The production of preheated compressed air in adequate quantities requires high energy consumption. The necessary equipment for this is complex and cost intensive.

There is, consequently, a need for an improved bending device and an improved bending method, wherein the suction effect necessary for holding against an upper mould can be produced more simply, more economically, and with a lower energy expenditure.

U.S. Pat. No. 4,764,196 discloses a bending device with skirt technology, wherein the air flow necessary for holding is produced using a fan. The glass pane is sucked by means of the skirt technology against an upper full mould (a mould with a full-surface contact surface, in contrast to a frame-like contact surface). The fan is arranged below the bending chamber. The exhausted air is routed in a circuit and guided from below back onto the pane to avoid undesirable deformation of the pane by the effect of gravity. The air circuit is equipped with an active heating device to bring the air to the desired temperature.

DE 3615 225 A1 discloses a bending device with a cross flow fan, which produces an air flow guided in a circuit, with which the pane is pressed against an upper mould. The air circuit is equipped with an active heating device to control the temperature of the air.

Further prior art can be found in the publications US 2013340479 A1, FR 2097019 A1, and DE 69423700 T2.

The object of the present invention is to provide an improved bending device and an improved bending method using skirt technology for holding the glass panes.

The object of the invention is accomplished according to the invention by a glass bending device according to the disclosure. Preferred embodiments are also discussed.

The device according to the invention includes a bending chamber. In the context of the invention, a "bending chamber" means a segment of space of a bending furnace that can be brought by means of a heating device to a to a predetermined temperature in order to bend glass panes. The bending chamber typically has an entrance and an exit, via which the glass panes to be bent can be transported into the bending chamber and out of the bending chamber. Transport is typically done on rollers or on a cart.

The device according to the invention also includes a tool for holding at least one glass pane by means of a suction effect (holding tool). The tool enables, during a bending process, the holding of the glass pane to be bent against the effect of gravity, in that a suction effect generated by a negative pressure is exerted on the glass pane such that the glass pane is pressed against the tool as a result of the suction effect. The tool can also be referred to as a suction mould.

The tool includes a contact surface, which is brought into contact with the glass pane to be held. The contact surface is frame-like. The tool is thus not a so-called "full-surface tool", with which the glass pane is brought into contact with a moulding surface over its entire surface. Instead, it belongs to the group of tools with which a peripheral region of the glass pane on the side edges or in the vicinity of the side edges is in direct contact with the tool, whereas most of the pane has no direct contact with the tool. Such a tool can also be referred to as a ring (holding ring, bending ring) or frame (frame mould). In the context of the invention, the term "frame-like contact surface" serves merely to distinguish the tools according to the invention from a full-surface mould (full mould). The contact surface need not form a complete frame, but can also be interrupted. The contact surface is implemented in the form of a complete or interrupted frame. The width of the contact surface is preferably from 0.1 cm to 10 cm, particularly preferably from 0.2 cm to 1 cm, for example, 0.3 cm. The tool is further equipped with a so-called skeleton, which means a flat structure that bears the contact surface. The skeleton is formed with the contact surface. The contact surface is arranged on the skeleton.

The contact surface is convex. The term "convex mould" means a mould wherein the corners and edges of the glass pane, in the intended contact with the tool, are curved nearer in the direction of the tool than the center of the pane. The tool according to the invention is, consequently, a so-called convex tool.

The contact surface is downward directed. This means that the contact surface faces the ground and that the skeleton bearing it is arranged above the contact surface (in other words, on the side of the contact surface facing away from the ground). Thus, the tool can hold the glass pane against the effect of gravity.

The tool further includes a cover. The cover is arranged on the side of the contact surface that is turned away from the glass pane during the holding or bending operation. The cover enables producing the suction effect essential for the holding operation. The suction effect is, in particular, produced by exhausting the air between the cover and the bending skeleton. The exhausting of the air is done via a suction tube.

The cover is implemented with a peripheral air-guiding plate surrounding the contact surface at least in regions. Such an air-guiding plate is frequently referred to as a skirt. The air guiding plate is preferably arranged at the end of the cover. The air-guiding plate surrounds or frames the contact surface completely or in sections. During the holding procedure, the air-guiding plate preferably has a distance from the side edges of the glass pane of 3 mm to 50 mm, particularly preferably of 5 mm to 30 mm, for example, 20 mm. By means of the air-guiding plate, the air flow produced by the suction effect is guided along the side edge of the glass pane such that the edge is swept by the air flow. Thus, the glass pane is pressed or sucked against the contact surface.

The tool can thus be used, in particular, as an upper mould in a bending process. The term "an upper mould" means a mould which contacts the upper surface of the glass facing away from the ground. The term "a lower bending mould" means a mould that contacts the lower surface of the glass pane facing the ground. The glass pane can be placed down onto a lower mould.

Even multiple, for example, two glass panes lying one atop the other can be held simultaneously by the tool according to the invention. The tool is, consequently, particularly suitable for methods of paired bending, in which two individual panes that are to be subsequently laminated to form a composite glass are congruently bent together simultaneously.

The device according to the invention also includes a fan that is connected to the bending chamber via a feed line and a return line. The fan is suitable and appropriately configured such that air is exhausted from the bending chamber via the holding tool according to the invention and the feed line and guided back into the bending chamber via the return line. The feed line, fan, and return line form a circuit in which the air flow necessary for holding the glass pane is produced. The feed line is, on the one hand, connected to the holding tool, in particular the suction tube of the holding tool and, on the other, to the fan. The return line is connected, on the one hand, to the fan and, on the other, to the bending chamber.

The major advantage of the invention resides in the use of the fan to produce the air flow. This renders the previously customary venturi nozzles and the production of heated compressed air superfluous. Glass bending can thus be designed significantly more energy savingly. In addition, the technical structure of the bending device is simplified. In addition, no additional air volume is guided to the bending chamber, as is unavoidable with the use of venturi nozzles. Thus, undesirable air flows, which can disturb the bending process, can be avoided. Moreover, excess pressure is produced within the bending chamber by additional air volume, resulting in the escape of warm air, which is associated with additional energy losses. The fan according to the invention avoids this problem.

In a preferred embodiment, the return line is connected to the bending chamber above the tool. This means that the point at which the air is guided back into the chamber is farther from the ground than the holding tool. Particularly preferably, the return line is arranged on the top of the bending chamber, meaning the upward delimiting surface (the "roof"). This arrangement enables, for one thing, a compact design and ensures, for another, that the bending process is not disturbed by the air flow produced by the return line.

In a particularly preferred embodiment, the feed line is also connected to the bending chamber above the tool, most particularly preferably on the top of the bending chamber.

In a preferred embodiment, the return line is connected to the bending chamber such that the glass pane is not blown on, in other words, is not impacted by the air flowing back. The circuit serves according to the invention merely to produce the suction effect. The air flowing back should affect the bending process as little as possible. In particular, direct blowing on the pane would have effects on the bending and should, consequently, be avoided. Since the air in the circuit can be cooled outside the bending chamber, direct blowing would also result in undesirable cooling of the pane.

The fan is preferably a radial fan. The rotational speed of the radial fan in operation is preferably at least 500 rpm. Particularly good results are thus achieved. A plurality of fans can also be used.

In a preferred embodiment, the fan is not arranged below the bending chamber. Thus, it is possible to avoid glass fragments falling into the fan in the event of glass breakage, which would make cleaning and maintenance work necessary. The fan can be arranged next to or above the bending chamber. The arrangement above the bending chamber enables a particularly compact design.

The feed line is preferably provided with an adjustable flap by means of which the feedline can be completely or partially sealed. It is thus possible to regulate the strength of the air flow, and the air flow can be turned off without the fan itself having to be operated.

In an advantageous embodiment, the circuit that is formed by the feedline, the fan, and the return line is not equipped with a heater, enabling a simple technical structure of the device. The device according to the invention makes no active heating of the air in the circuit outside the bending chamber necessary. The compression of the sucked-in air caused by the fan results in heating. It has been shown that this effect compensates the cooling of the air outside the bending chamber.

In an advantageous embodiment, the device furthermore includes a full-surface lower bending mould. The term "a full-surface mould" or "full mould" means a solid bending mould with a contact surface that comes into contact with the entire surface or most of the surface of the pane to be bent. It must be distinguished in particular from a frame mould. The lower bending mould can be moved under the tool for holding the pane and the pane can be subjected to a press-bending step between the holding tool and the lower bending mould. The lower bending mould can be provided with openings through which a suction effect can be exerted on the pane in order to further deform the pane.

In an advantageous embodiment, the device, furthermore, includes a gravity bending mould that is mounted on a cart and is movable between the bending chamber and the external environment. The movable gravity bending mould is in particular suitable for transporting the glass pane to be bent from the outside into the bending chamber. The gravity bending mould has a concave contact surface, preferably a frame-like contact surface. After heating of the pane to softening temperature in the bending chamber or an upstream furnace, the pane rests under the effect of gravity against the contact surface, by which means pre-bending is achieved. The gravity bending mould is movable, in particular, under the holding tool according to the invention such that the pane or the panes can be picked up from the gravity bending mould by the holding tool. Typically, the holding tool is lowered vertically for this; however, in principle, raising of the gravity bending mould or a combination of the two vertical movements is also possible.

The object of the invention is further accomplished by a method for bending at least one glass pane that is carried out in a bending chamber and includes at least one holding step, in which a tool is used as an upper mould that includes a downward-directed frame-like, convex contact surface and a cover with a peripheral air-guiding plate surrounding the contact surface at least in regions, in order to hold the glass pane against the tool against the effect of gravity by means of an air flow sweeping the edge, wherein the air flow is produced by a fan that extracts air from the bending chamber via the tool and a feed line in order to produce the air flow and guides it back into the bending chamber via a return line.

In an advantageous embodiment, the method is used simultaneously on at least two, preferably two glass panes lying one atop another. The glass panes are simultaneously held pairwise (in other words, as a pair of panes) by the tool and bent in the bending process. The curvature of the two panes is then particularly congruent and matched to one another such that the panes are particularly suitable for being laminated to one another to form a composite glass of high optical quality. By means of the suction effect produced by the fan, two, or even more, panes can be reliably held against the tool.

In an advantageous embodiment, the method includes a press-bending step, wherein the glass pane is bent between the holding tool according to the invention and a full-surface lower bending mould. The lower bending mould is moved in particular under the holding tool while the glass pane is fixed on the holding tool. Next, the holding tool and the lower bending mould are brought near one another and the glass pane is pressed therebetween. The bringing near can be done by vertical movement of the holding tool and/or the lower bending mould.

In an advantageous embodiment, the glass pane or glass panes to be bent are transported into the bending chamber on a gravity bending mould that is movably mounted on a cart. The pane is heated to softening temperature on the gravity bending mould and pre-bent by gravity bending. The heating of the pane to softening temperature can be done in the bending chamber or in an upstream separate chamber. Then, the pane is picked up by the holding tool according to the invention and transferred in its further course onto another mould.

The method is, in a particularly preferred embodiment, the method that is described in detail in EP 1 836 136 B1, wherein the air flow necessary for holding the glass panes on the upper mould ("forme supérieure 11") according to the invention is produced by the fan. The method is preferably carried out using the device that is described in detail in EP 1 836 136 B1, wherein the device is supplemented according to the invention by the fan.

Preferably, the glass pane is first heated to bending temperature and pre-bent on a gravity bending mould. Typically, the glass pane, flat in its starting state, is positioned on the gravity bending mould. The gravity bending mould is typically implemented movable, for example, mounted on a cart and runs through a furnace for heating, wherein the glass pane is heated to bending temperature. The term "bending temperature" means a temperature at which the glass is adequately softened in order to be able to be deformed. Typical bending temperatures are from 500° C. to 700° C., preferably from 550° C. to 650° C. The gravity bending mould is preferably a concave mould, complementary to the tool according to the invention. By means of the heating to bending temperature, the glass pane is softened and nestles against the gravity bending mould under the action of gravity. The glass pane is thus pre-bent by gravity bending before it is further bent by additional process steps.

After pre-bending, the glass pane is picked up from the gravity bending mould by the holding tool according to the invention. The holding tool is brought near the glass pane from above, which can be achieved by vertical movement of the holding tool and/or of the gravity bending mould. The holding tool thus acts as the upper mould. With an adequately small distance between them, the glass pane is sucked against the holding tool and held thereby by a suction effect. The glass pane is brought into contact with the contact surface such that the edge of the glass pane is swept by the air flow, at least in sections. The glass pane is thus taken over from the gravity bending mould by the tool according to the invention.

Optionally, further bending can be associated with the sucking of the glass pane against the tool. This can, for example, be achieved by a suitable shaping of the contact surface such that the glass pane nestles against the contact surface as a result of the suction effect and is thus bent. The tool then acts simultaneously as a holding tool and a bending tool.

Preferably, the glass pane is subjected, after pre-bending and takeover by the holding tool, to a press-bending step between the holding tool and a lower bending mould. The deformation of the glass pane is done by the effect of pressure and/or suction of the two complementary bending tools. The lower bending mould is preferably concave, solid (as a full-surface mould) and is, particularly preferably, provided with openings. Preferably, a suction effect that is suitable for further deforming the glass pane is exerted on the glass pane through the openings of the lower bending mould. During the press-bending, the glass pane is fixed between the moulds such that the suction effect of the upper mould can be turned off. In this case, the glass pane remains in the lower bending mould after separation of the moulds.

The glass pane is, preferably after press-bending, transferred by the holding tool according to the invention onto a lower tray mould, on which it is transported out of the bending chamber and cooled. This lower mould is particularly preferably a gravity bending mould. It can be the same gravity bending mould on which the pane was transported into the bending chamber, or even a different one that is arranged with the first preferably in a train.

It is possible to use two different holding tools according to the invention for the takeover of the glass pane out of the gravity bending mould (pre-bending mould) and for the transfer of the glass pane from the lower bending mould (press-bending mould) onto the tray mould for cooling. The two holding tools according to the invention can, for example, have a differently designed contact surface, which take into account the different pane shapes in the various process phases. The two tools can, however, also be designed identically, with the use of two tools having advantages from a process technology standpoint, for example, with regard to the cycle time, as described in EP 1 836 136 B1.

The glass pane or the glass panes preferably contain soda lime glass, but can, alternatively, also contain other glass types, such as borosilicate glass or quartz glass. The thickness of the glass panes is typically 0.5 mm to 10 mm, preferably 1 mm to 5 mm.

When two or more glass panes are bent simultaneously, a separation means is preferably arranged between the panes such that the panes do not permanently adhere to one another.

The invention also includes the use of a fan in a glass bending device to produce an air flow for holding at least one glass pane against a tool by means of a suction effect, wherein the air flow is produced in that air is exhausted out of a bending chamber via the tool and a feed line and routed back into the bending chamber via a return line. The tool includes, in particular, a downward-directed frame-like, convex contact surface and a cover with a peripheral air-guiding plate surrounding the contact surface, at least in regions.

In the following, the invention is explained in detail with reference to drawings and exemplary embodiments. The drawings are schematic representations and not to scale. The drawings in no way limit the invention.

Figure 2:
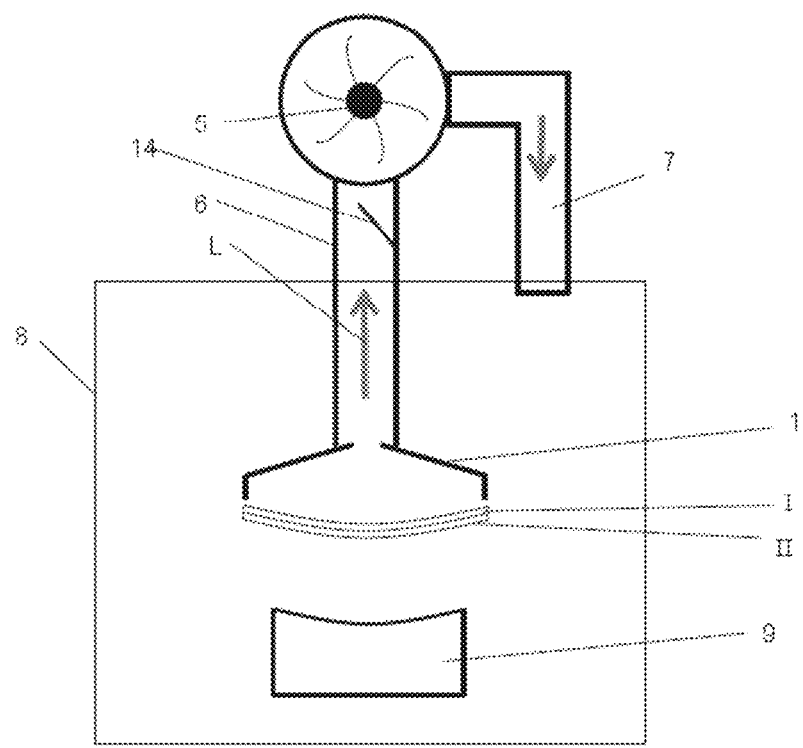
Figure 3:
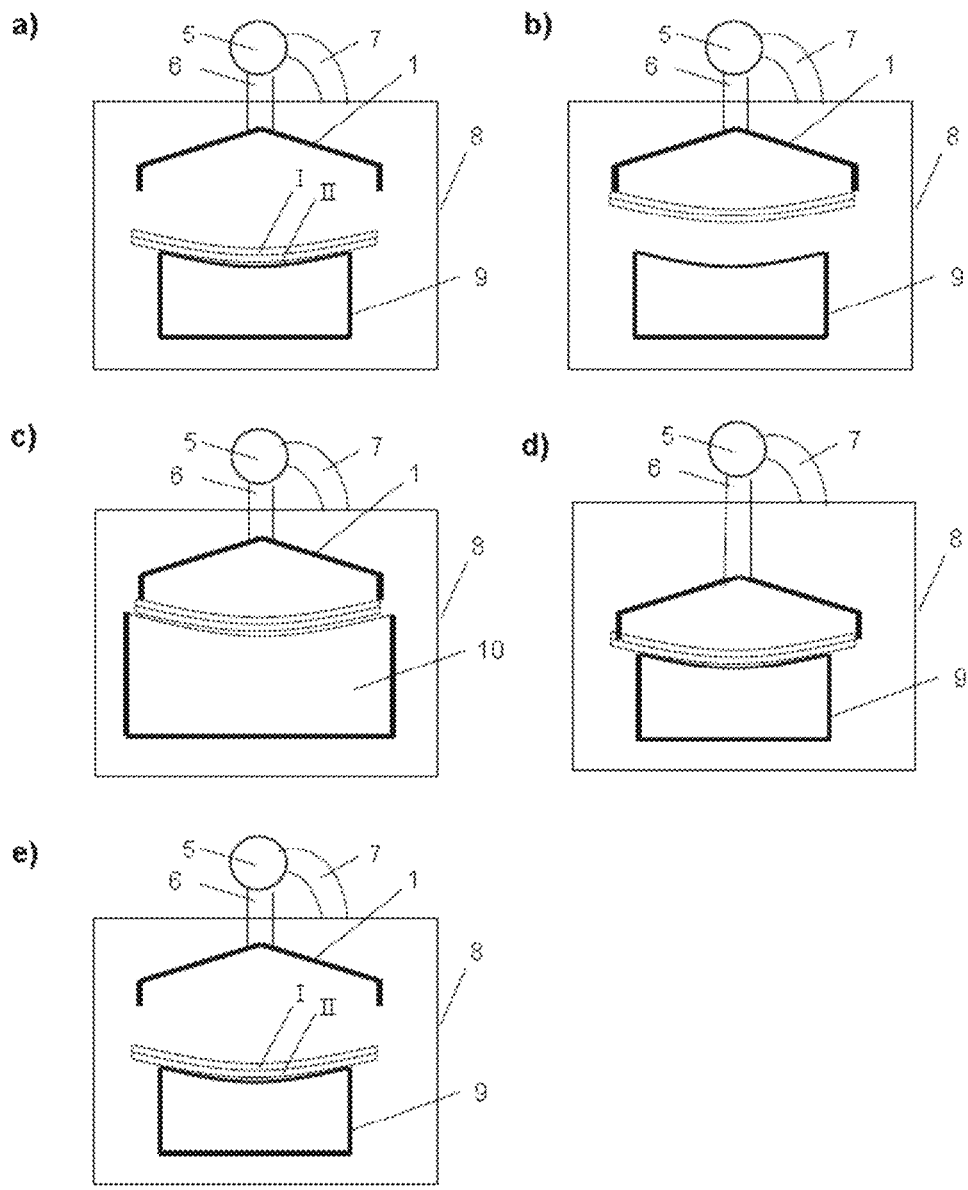
Figure 4:
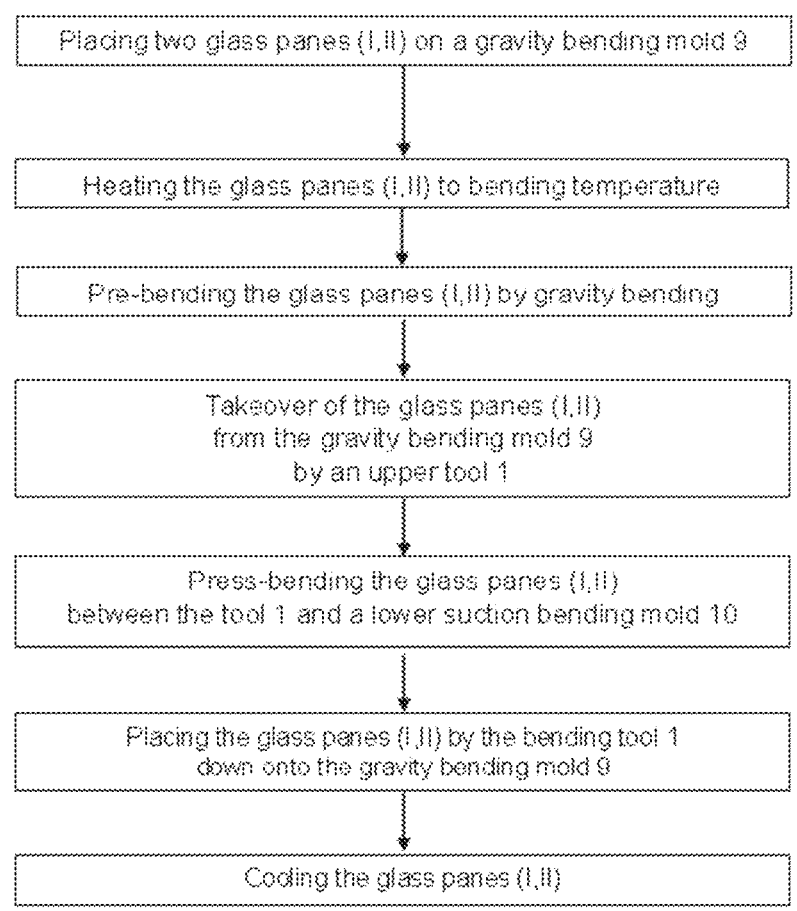

They depict:

FIG. 1 a cross-section through a tool for holding at least one glass pane by means of a suction effect, FIG. 2 a cross-section through an embodiment of the glass bending device according to the invention with the tool, FIG. 3 a stepwise representation of an embodiment of the method according to the invention, and FIG. 4 a flowchart of an embodiment of the method according to the invention.

FIG. 1 depicts a tool 1 known per se for holding at least one glass pane by means of a suction effect (holding tool). The tool 1 is an upper mould that is suitable for holding two glass panes I, II lying one atop the other against a frame-like, convex contact surface 2 by means of a suction effect against the effect of gravity. The contact surface 2 is arranged on a so-called skeleton 13. For producing the suction effect, the tool 1 has a suction tube 12, via which air is exhausted. The tool further has a cover 3, whose end is equipped with a peripheral air-guiding plate 4. The air-guiding plate 4 surrounds the contact surface 2 peripherally. By means of the bending skeleton 13 and the cover 3 with the air-guiding plate 4, the air flow produced by the suction tube 12 is routed such that it sweeps the edges of the glass panes. Thus, the pair of glass panes I, II is reliably held against the contact surface 2.

The panes I, II are pre-bent, for example, by gravity bending in a lower bending mould. The tool depicted can be used, for example, to pick up the pair of glass panes I, II out of the lower mould and to transfer it to another mould. For example, the pair of glass panes I, II can be subjected to a press-bending process, wherein it is shaped between the tool depicted and a counter mould under the influence of the effect of pressure and/or suction.

The tool presented and the bending method in which it can be used are known from EP 1 836 136 B1, WO 2012/080071 A1, and WO 2012/080072 A1.

FIG. 2 depicts a glass bending device according to the invention which includes the tool 1 of FIG. 1 known per se in a bending chamber 8. The bending chamber 8 can be warmed by means of a heating device (not shown) to a temperature above the softening temperature of the panes to be bent. The device includes a gravity bending mould 9 movably mounted on a cart, on which the glass pane pair I, II was transported in the situation depicted and was pre-bent by means of gravity bending. In the depicted, the pair of glass panes I, II was picked up by the tool 1 and reliably fixed against it by the suction effect.

The suction effect required is caused by a stream of air L, which is produced according to the invention by a fan 5, which is arranged above the bending chamber 8. The fan 5 exhausts air from the bending chamber 8 via the tool 1 and the feed line 6 connected thereto. The feed line 6 is connected to the above-described suction tube of the tool 1. The air flow L is guided back into the bending chamber 8 via a return line 7, and, in fact, on the top of the bending chamber 8. The feed line 6 is provided with a flap 14 by means of which the strength of the air flow L can be regulated and the air flow L can be interrupted, without changing the speed a revolution of the fan 5.

The circuit according to the invention consisting of the feed line 6, the fan 5, and the return line 7 to produce the air flow L enables a significant savings of energy. It is possible to dispense with expensive venturi nozzles operated with preheated compressed air. By means of the recirculation of the air, little energy is diverted out of the system. The compression of the air by means of the fan 5 results in warming which substantially compensates the cooling of the air outside the bending chamber 8 such that the circuit need not be equipped with a separate heating device. By introducing the air on the top of the bending chamber 8, as a result of which the glass panes I, II are not impacted by the air flow L flowing back, the influence on the bending process is negligible—the glass bending is not interfered with. These are major advantages of the invention.

FIG. 3 schematically depicts the steps of an embodiment of the method according to the invention. First, two glass panes I, II lying one atop the other, which are flat in the starting state, are positioned on a gravity bending mould 9 and transported thereon into the bending chamber. The glass panes I, II are heated to bending temperature, for example, 600° C. such that they nestle under the effect of gravity against the gravity bending mould 9. The heating is done, for example, in a tunnel furnace, which is part of the bending chamber 8 or is situated upstream therefrom. Inside the bending chamber 8, the pre-bent glass panes I, II are positioned on the gravity bending mould 9 below the tool 1 for holding the glass panes I, II (Part a). The tool 1 is lowered and the flap 14 is then opened, by which means the suction effect acts on the glass panes I, II, which are then raised with the tool 1 by the gravity bending mould 9 (Part b). Then, a full-surface lower bending mould 10 is positioned under the tool 1. The suction bending mould 10 can, for example, be mounted on an arm and be retracted between the tool 1 and the gravity bending mould 9. The glass panes I, II are bent into their final shape between the tool 1 and the suction bending mould 10 by press-bending (Part c). During the press-bending, the suction effect of the upper tool 1 is turned off. After the press-bending, the glass panes I, II are picked up again by the tool 1. The suction bending mould 10 is then moved away again and the glass panes I, II are put down by tool 1 onto a gravity bending mould 9 (Part d, e). The glass panes I, II are transported out of the bending furnace 8 on this gravity bending mould 9 and cooled.

The process steps presented schematically here reflect the method described in more detail in EP 1 836 136 B1, wherein the glass bending device used there to produce the air flow L has been supplemented by the circuit made up of the feed line 6, the fan 5, and the return line 7.

FIG. 4 depicts the exemplary embodiment of FIG. 3 with reference to a flowchart.

LIST OF REFERENCE CHARACTERS (1) tool for holding at least one glass pane
(2) frame-like contact surface (3) cover
(4) air-guiding plate
(5) fan
(6) feed line
(7) return line
(8) bending chamber
(9) gravity bending mould
(10) lower bending mould
(12) suction tube of 1
(13) skeleton of 1
(14) flap of 6
(L) air flow
(I) glass pane
(II) glass pane

The invention claimed is:

1. A glass bending device comprising:
a bending chamber;
a tool for holding a glass pane by means of a suction effect, comprising a downward directed frame-like, convex contact surface and a cover with a peripheral air guiding plate, wherein the cover surrounds the contact surface in regions and wherein the tool is suitable for sweeping an edge of the glass pane at least in sections with an air flow and thereby pressing the glass pane against the contact surface; and
a radial fan, wherein the radial fan does not include a Venturi nozzle, which is connected to the bending chamber via a feed line and a return line and is suitable for extracting air from the bending chamber via the tool and the feed line to produce an air flow and for returning air back into the bending chamber via the return line, which is connected to the bending chamber such that the air flow flowing back into the bending chamber is not directly blown onto the glass pane;
wherein the return line is directly connected to the radial fan and to the bending chamber above the tool such that air extracted by the radial fan is compressed by the radial fan to form a flow of heated compressed air that is solely supplied to the return line and the bending chamber, the return line not being equipped with a heater.

2. The glass bending device according to claim 1, wherein the return line is connected on a top of the bending chamber.

3. The glass bending device according to claim 1, wherein the fan is arranged next to or above the bending chamber.

4. The glass bending device according to claim 1, wherein a circuit formed by the feed line, the fan, and the return line is not equipped with a heater.

5. The glass bending device according to claim 1, further including a full-surface lower bending mould, which is movable under the tool, in order to subject the glass pane to a press-bending step between the tool and the lower bending mould.

6. The glass bending device according to claim 1, which includes a gravity bending mould, which is movable into the bending chamber under the tool.

7. The glass bending device according to claim 1, wherein the feed line is equipped with a movable flap, wherein the movable flap can completely or partially seal the feed line.

8. The glass bending device according to claim 1, wherein the return line extends from a first end thereof at an upward delimiting surface of the bending chamber, to a second end thereof at the radial fan.

* * * * *